(12) United States Patent
Chambers et al.

(10) Patent No.: US 7,558,220 B2
(45) Date of Patent: Jul. 7, 2009

(54) METHOD AND DEVICE FOR PROVIDING A COMMUNICATION SESSION

(75) Inventors: Michael J. Chambers, Erlangen (DE); Pierluigi Pugliese, Vaterstetten (DE)

(73) Assignee: Agere Systems Inc., Allentown, PA (US)

( * ) Notice: Subject to any disclaimer, the term of this patent is extended or adjusted under 35 U.S.C. 154(b) by 984 days.

(21) Appl. No.: 10/348,244

(22) Filed: Jan. 21, 2003

(65) Prior Publication Data
US 2003/0142654 A1    Jul. 31, 2003

(30) Foreign Application Priority Data
Jan. 29, 2002    (EP)    ................... 02002167

(51) Int. Cl.
*H04L 12/16*    (2006.01)
(52) U.S. Cl. ...................... 370/260; 370/270
(58) Field of Classification Search ................ 370/349, 370/338, 353, 260, 261, 265, 270; 709/227, 709/203, 204; 455/466
See application file for complete search history.

(56) References Cited

U.S. PATENT DOCUMENTS

| | | | | |
|---|---|---|---|---|
| 5,729,687 | A * | 3/1998 | Rothrock et al. | 709/204 |
| 5,835,724 | A * | 11/1998 | Smith | 709/227 |
| 5,915,245 | A * | 6/1999 | Patterson et al. | 705/35 |
| 6,173,312 | B1 * | 1/2001 | Atarashi et al. | 709/203 |
| 6,308,079 | B1 * | 10/2001 | Pan et al. | 455/519 |
| 6,356,761 | B1 * | 3/2002 | Huttunen et al. | 455/456.1 |
| 6,564,261 | B1 * | 5/2003 | Gudjonsson et al. | 709/227 |
| 6,856,809 | B2 * | 2/2005 | Fostick | 455/466 |
| 2002/0054053 | A1 * | 5/2002 | Naimi et al. | 345/700 |
| 2002/0057678 | A1 * | 5/2002 | Jiang et al. | 370/353 |
| 2002/0078150 | A1 * | 6/2002 | Thompson et al. | 709/204 |
| 2002/0131395 | A1 * | 9/2002 | Wang | 370/349 |
| 2003/0063121 | A1 * | 4/2003 | Kumhyr et al. | 345/751 |

(Continued)

FOREIGN PATENT DOCUMENTS

GB    2317073 A    *    3/1998

(Continued)

OTHER PUBLICATIONS

Handley,Schulzrinne, Schooler and Rosenberg, Internet Engineering Task Force, SIP: Seession Initiation Protocol (Internet Draft), Jun. 5, 2000.*

(Continued)

*Primary Examiner*—Kwang B Yao
*Assistant Examiner*—Andrew Lai

(57) ABSTRACT

A method and device for providing a communication or chat session with a plurality of users, in particular for mobile radio networks according to Global System for Mobile communication (GSM) or Universal Mobile Telecommunications System (UMTS) standards. A first user starts a General Packet Radio Service (GPRS) session requesting an Internet Protocol (IP) address at the network. The first user then sends an initiation message including the IP address to a plurality of other users which preferably are selected from a mobile station's telephone book. Addressed users also request IP addresses at the respective networks and send a reply including the respective IP address via GPRS to the first user. After receiving at least one reply, the first user activates a chat session and all participants can exchange messages, preferably text and images, via GPRS or another packet switched service.

31 Claims, 2 Drawing Sheets

U.S. PATENT DOCUMENTS

2003/0108002 A1* 6/2003 Chaney et al. ............ 370/261

FOREIGN PATENT DOCUMENTS

| WO | WO 00/69140 | 11/2000 |
| WO | WO 00/70898 | 11/2000 |

OTHER PUBLICATIONS

Handley el al, Internet Engineeing Task Force, SIP: Session Initiation Protocol (Internet Draft), Jun. 5, 2000.*

Rosenberg el al, Internet Enigeering Task Force, Models for Multi Party Conferencing in SIP (Internet Draft), Nov. 17, 2000.*

"Wireless Village—The Mobile IMPS Initiative" Frequently Asked Questions; www.wireless-village.org; pp. 1-11; Apr. 26, 2001.

"SIP: Session Initiation Protocol" by Handley, et al.; pp. 1-129; Jun. 5, 2000.

Wiral: "Overcoming the two major barriers to Wireless IM adoption: Interoperability and usability" www.wiral.com; Nov. 15, 2001; pp. 1-16.

Rosenberg, et al.; "Models for Multi Party Conferencing in SIP"; (draft-rosenberg-sip-conferencing-models-01.txt), Jul. 20, 2001, pp. 1-26.

Miladinovic, et al.; "SIP Extensions for Multiparty Conferencing"; (draft-miladinovic-sip-multiparty-ext-00.txt), XP15004409, Feb. 6, 2001, pp. 1-9.

Can be obtained at: http://en.wikipedia.org/wiki/short_message_service.

* cited by examiner

METHOD AND DEVICE FOR PROVIDING A COMMUNICATION SESSION

CROSS-REFERENCE TO FOREIGN APPLICATION

This application claims the benefit of EP Patent Application No. 02002167.1 entitled "Method and Device for Providing a Communication Session" to Michael J. Chambers, et al., filed on Jan. 29, 2002, which is incorporated herein by reference.

TECHNICAL FIELD OF THE INVENTION

The present invention is directed, in general, to communication systems and, more specifically, a method and device for providing a communication session in a communications system.

BACKGROUND OF THE INVENTION

The increase of competition between network operators of communications systems and the increase of telecommunication users particularly in the field of mobile communication has attributed to a nearly unappeasable demand for new and improved communication services. In today's information society, the interest in telecommunications in general and, in particular, digital mobile radio telecommunication is increasing for all types of text, speech or data transmission. Recently, exchanging text messages has especially become very popular.

Subscribers, or users, of Global System for Mobile communication (GSM) networks frequently use the GSM short message service (SMS) to communicate with their peer group. Presently, a user sends a SMS-message by selecting a respective menu item on a mobile phone, entering text, entering a telephone number of a recipient and sending the text using the SMS. On most mobile telephones, this procedure has to be repeated for each designated recipient even though the user may transmit the same text. Typically, the user reads a received SMS-message through a similar long and complicated procedure.

Though sending and receiving SMS-messages is popular, there are several deficiencies associated with the present operation. For example, the user cannot simultaneously see a received SMS-message and the text to be sent. Additionally, the user cannot send and receive a SMS-message simultaneously. A user, therefore, may have to remember the content of the received SMS-message to send a response. Even with these deficiencies, the cost of SMS can be expensive with a typical cost for transmitting a SMS-message at about 0.2 Euro.

Another deficiency associated with SMS is the restriction of 160 characters for each SMS-message. Additionally, the user may not receive a confirmation that the SMS-message was received or read by the recipient. Also, sending and receiving SMS-messages may be slowed since SMS-messages are routed via a server in a network backbone of a GSM-network. The server may slow the process by buffering or storing the SMS-message before being transmitted to the recipient.

The above mentioned deficiencies can make correspondence via SMS-messages disadvantageous not only for users but also for a network operator. This is especially true when the correspondence includes the exchange of several subsequent SMS-messages between the users. The disadvantages may increase when more than two users try to communicate via SMS. Essentially, a simultaneous exchange of text is not possible.

Accordingly, what is needed in the art are improvements for communicating via text messages especially for sending and receiving text messages between multiple users.

SUMMARY OF THE INVENTION

To address the above-discussed deficiencies of the prior art, the present invention furnishes a method for providing a communication session with at least a first and second user of a communications system including at least a first and second terminal assigned to the first and second user, respectively. In one embodiment, the method includes transmitting an initiation message from the first terminal to the second terminal with the initiation message including a first address assigned to the first terminal. After receiving the initiation message, the second terminal transmits a first reply to the initiation message, which is received by the first terminal.

When the first user or initiator wants to start the communication session, the user first selects one or more other users, together defining a selected group of users. Selection input in the first terminal includes selecting one or more users from a phone book or manually typing one or more subscriber identifications or telephone numbers. When all chosen participants are selected, the initiation message, e.g., a SMS-message, including at least the first address of the first user is sent to each member of the group. Each member receiving the initiation message is enabled to decide whether to participate in the offered communication session. If so, the user requests an address and sends a reply including the address to the initiator. When receiving the reply the initiator terminal will automatically mark this replying user as active. With the first received reply, the session also becomes automatically active.

In another aspect, the present invention provides a method for transmitting a circuit switched message from a first terminal assigned to a first user of a communications system to second and third terminals having second and third users. This method includes providing via the first terminal an input by the first user for the circuit switched message and defining a group of users. The method further includes selecting a subscriber number for the second and third terminals and transmitting the message to the second and third terminals.

In yet another aspect, the present invention provides a device for use with a communications system including a means for storing an initiator address, a means for transmitting an initiation message to receiving terminals wherein the initiation message includes the initiator address and a means for receiving a reply message from the receiving terminals.

In yet still another aspect, the present invention furnishes a telecommunications network providing packet data protocol addressed service including a plurality of base transceiving stations, a plurality of base station controllers, at least a serving packet radio service support node and a device. The device includes a means for storing an initiator address, a means for transmitting an initiation message to a receiving device wherein the initiation message includes the initiator address and a means for receiving a reply message from the receiving device.

The communication session initiated or provided by the present invention allows the users to exchange data, e.g., text or images, in a simple and inexpensive manner. In particular, the exchanged data can be received and transmitted simultaneously. Furthermore a communication session in real time may be enabled.

Therefore, the principles of the present invention serve several purposes such as providing a method and device for providing a communication session with improved capabilities in addition to avoiding the aforementioned disadvantages. A further object of the present invention is to provide a method and device which is suitable for a communication session with a plurality of users. Additionally, an object of the present invention is to provide a method and device which enables exchanging a large amount of data, e.g., text and/or images, in a convenient, inexpensive and fast manner. Another objective of the present invention is to provide a method and device which can be implemented in already existing communications systems, e.g., in GSM or Universal Mobile Telecommunications System (UMTS) networks. The present invention also has an objective to provide a method and device for providing a communication session wherein users with mobile and wirebound terminals can participate.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
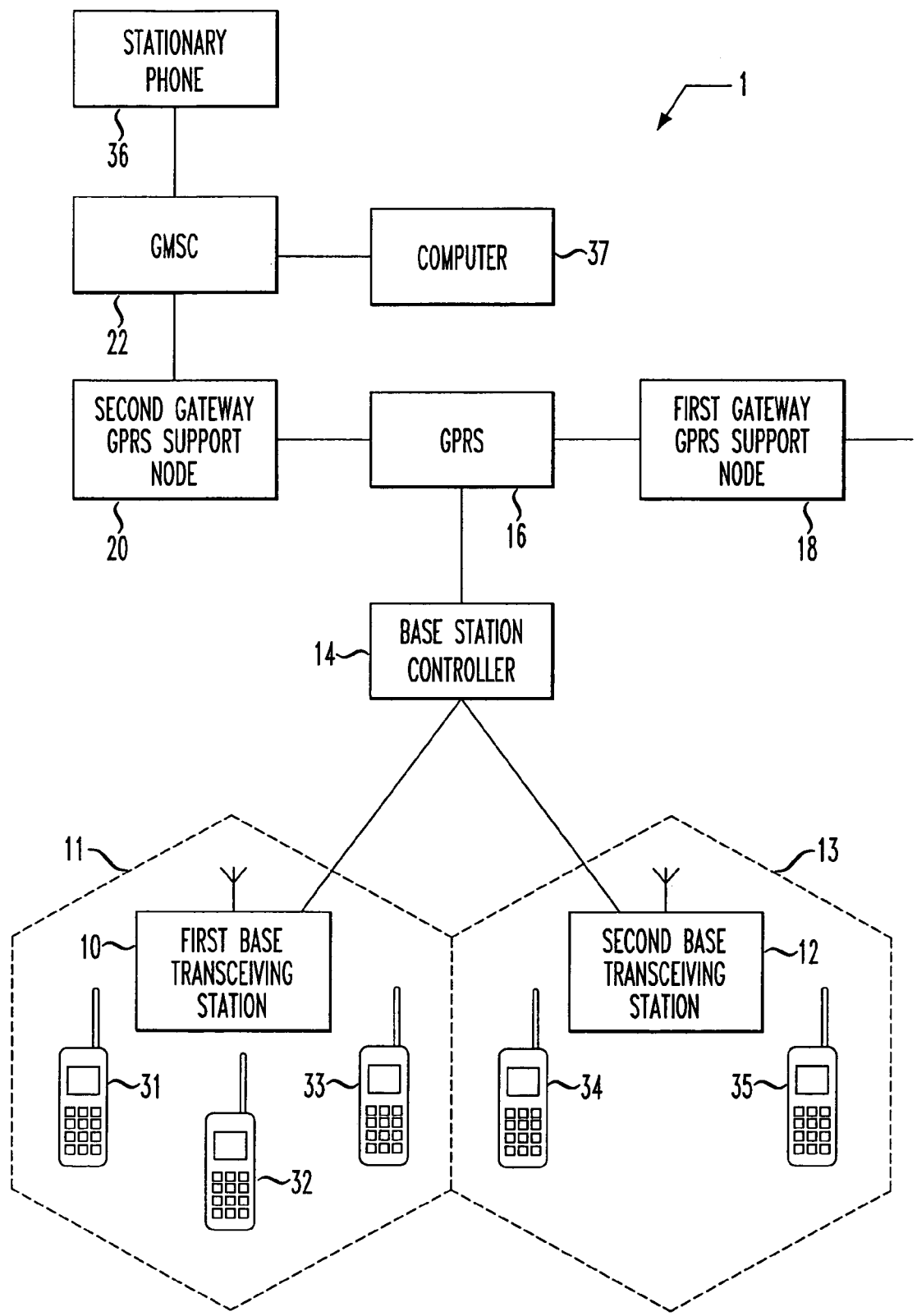
FIG. 1 illustrates a network diagram of an embodiment of a portion of a system architecture of a communications system constructed in accordance with the principles of the present invention.

Referring initially to FIG. 1, illustrated is a network diagram of an embodiment of a portion of a system architecture of a communications system, generally designated 1, constructed in accordance with the principles of the present invention. The communications system 1 includes a first and a second cell 11, 13, a base station controller 14, a serving General Packet Radio Service (GPRS) support node 16, a first and a second gateway GPRS support node 18, 20, a gateway mobile switching centre (GMSC) 22, a stationary telephone 36 and a computer 37. The first cell 11 includes a first base transceiving station 10 and mobile phones 31, 32, 33. The second cell 13 includes a second base transceiving station 12 and mobile phones 34, 35. One skilled in the pertinent art will understand that the aforementioned components are merely an exemplary portion of a telecommunications network with an operating network typically comprising a large plurality of each of these components.

The communications system 1 may be a packet switched service system such as with a General Packet Radio Service (GPRS). In a preferred embodiment, the communications system 1 or at least a portion of it may be a digital system including Global System for Mobile Communication (GSM) network or a Universal Mobile Telecommunications System (UMTS) network. Of course in other embodiments the communications system 1 may be another protocol based communications network that is text messaging enabled.

The first and second cell 11, 13, may be cells within a communications system such as a GSM or UMTS network that employ the first base transceiving station 10 and the second base transceiving station 12 to serve the respective mobile phones 31, 32, 33, 34, 35. The first and second base transceiving station 10, 12, may be conventional base transceivers of a GSM or UMTS network which provide, for example, a wireless/wireline protocol conversion for data from/to the mobile phones 31, 32, 33, 34, 35. The first and second base transceiving stations 10, 12, may be wirelined coupled to the base station controller 14 and wirelessly coupled to the respective mobile phones 31, 32, 33, 34, 35, for example, via radio channels.

The mobile phones 31, 32, 33, 34, 35, may be capable of employing a packet switched service such as GPRS. Preferably, each one of the mobile phones 31, 32, 33, 34, 35, are capable of operating within a GSM or UMTS network. Of course, one skilled in the art will understand that other terminals capable of operating within a GSM or UMTS network may also be used instead of or in addition to the mobile phones 31, 32, 33, 34, 35. The mobile phones 31, 32, 33, 34, 35, may be conventional phones which include, for example, a keypad and a display. When using a telephone having a 10-button keyboard with multiple character occupancy, user convenience may be largely improved when a word recognition software or method adapted to such a 10-button keyboard is provided.

In some embodiments, the display of each mobile phone 31, 32, 33, 34, 35, may be divided into two portions to allow entering its own text, or text to be transmitted, using a first portion and displaying incoming text in a second portion. For example, a top portion of the display may be used to enter text to be transmitted and a lower portion of the display may be used to display incoming text. When no text to be transmitted is being displayed, the whole screen may be used to display incoming text.

The base station controller 14, the GPRS 16, the first and second gateway GPRS supports nodes 18, 20, and the GMSC 22 may be conventional devices that are inter-coupled to provide a network backbone that is GPRS enabled. Preferably, the network backbone employs an Internet Protocol (IP) or a Wireless Application Protocol (WAP). The stationary phone 36 and the computer 37 may be a conventional telephone and computer which is wirebound connected to the communications system 1 via the GMSC 22.

Figure 2:
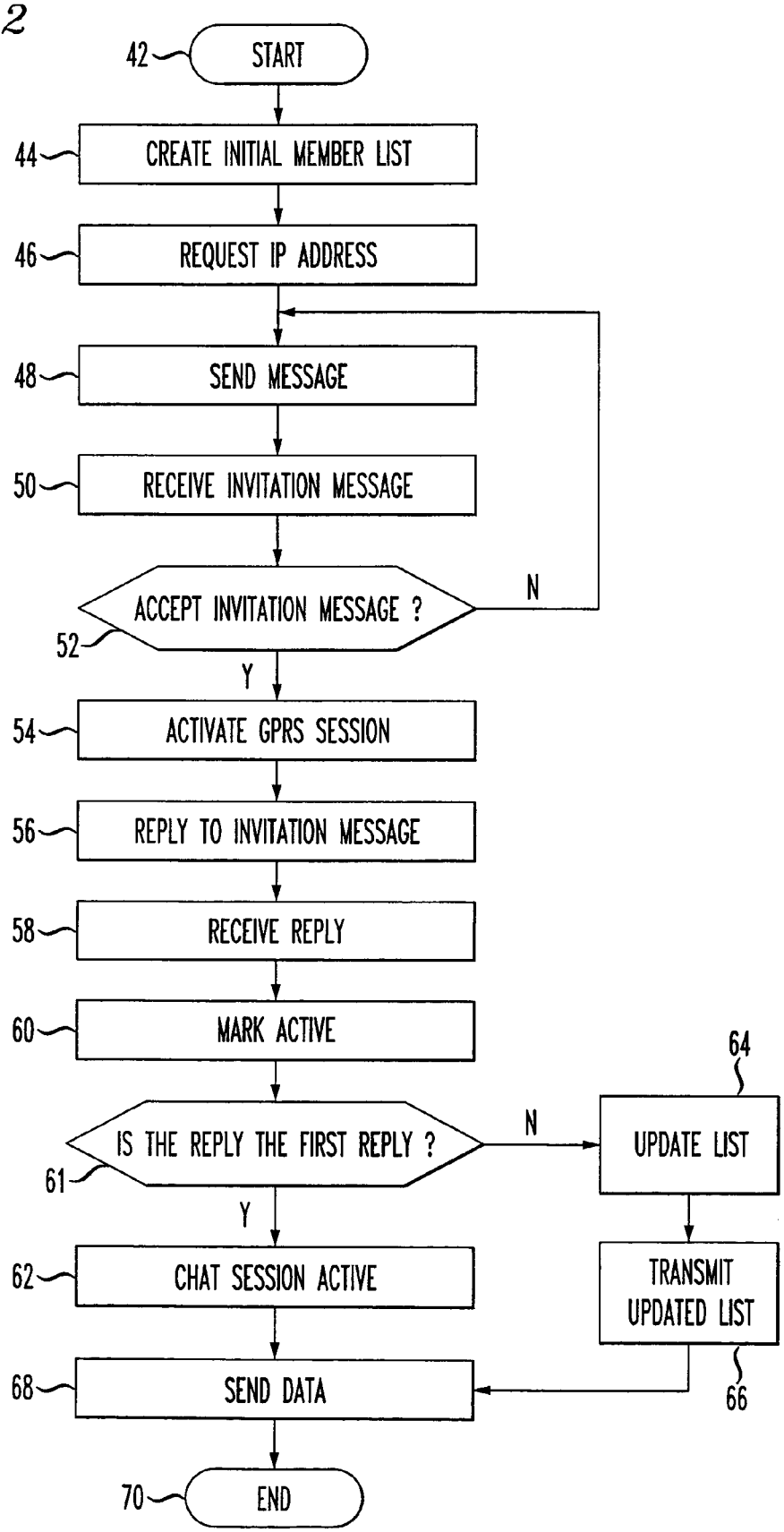
FIG. 2 illustrates a flow diagram of a preferred embodiment of a method of providing a communication session in accordance with the principles of the of the present invention.

Turning now to FIG. 2, illustrated is a flow diagram of a preferred embodiment of a method of providing a communication session constructed in accordance with the principles of the present invention. The method may be easily implemented in an existing communications system, (e.g., a network according to GSM or UMTS) and for clarity purposes, will be described referencing the communications system 1 of FIG. 1. The method starts in a step 42 with an intent to initiate a communication session.

After initiating, an initial member list is created in a step 44. A user of a GPRS terminal, for example mobile phone 31, may start a communication session or, more precisely, a chat session by creating the initial member list. The user may be designated an initiator with the user's mobile phone designated an initiator terminal. Of course, in some embodiments, the initiator terminal may be other devices besides a mobile telephone. Advantageously, the initiator may be identified by a first address which is preferably a unique world-wide address.

The initial member list may be a list of subscriber identification or telephone numbers of other chat session enabled GPRS mobile and fixed-line telephone users who will be invited to join the chat session. Selecting subscribers may be simplified by selecting entries from a telephone book of the initiator terminal. Once the initial member list includes all chosen users, for example, assigned to mobile phones 32, 33, 34, 35, stationary phone 36 and computer 37, a GPRS session may be activated.

After creating the initial members list, an IP address for the initiator terminal is requested in a step 46. In one embodiment, the initiator terminal's IP address (first address) may be requested from a network and transmitted via a radio channel from a base transceiving station to the initiator terminal. Preferably, the initiator terminal's address is requested from a stationary part of a communications system or network such as a server at the backbone of the network. In another embodiment, the initiator terminal may already have an IP address. This may occur when the initiator's terminal is already online when the invitation message is ready to be sent. For example, the user's terminal may have been using Internet or WAP services. In this case, the user's terminal existing address may be used instead of requesting a new one.

After requesting the IP address, an initiation or invitation message is sent to members of the initial member list in a step 48. The invitation message may preferably be a SMS-message that is automatically sent by the initiator terminal to each member of the initial member list. The initiator terminal's IP address, a telephone number, a chat session name, a greeting and a nickname of the initiator may be included in the invitation message. Preferably, the initiator terminal's address is requested before sending the invitation message.

Advantageously, the SMS is available at any time and can be used even when an invitation message recipient has switched off his terminal. In this case, the invitation message may be stored by a server of a network back-bone and then be automatically transmitted to the corresponding recipients after each recipient is switched on and logs on to the network.

After sending the invitation message, the invitation message is received in a step 50. The invitation message may be received by each member of the initial member list. For example, the mobile phones 32, 33, 34, 35, 36, 37, may receive the invitation message from the mobile phone 31.

After receiving the invitation message, a determination is made to accept the invitation message in a first decisional step 52. Each member of the initial member list that receives the invitation message may determine to accept or reject the invitation message by a respective input. The respective input may be, for example, a keypad entry or a voice command. If a member rejects the invitation message, the method returns to step 48.

If a member accepts the invitation message, a GPRS session is activated in a step 54. Upon accepting the invitation message, the member's or user's terminal may activate a GPRS session. In some embodiments, the user's terminal may request an IP address from the network. In other embodiments, the user's terminal may already have an IP address.

After activating a GPRS session, a reply is sent to the invitation message in a step 56. In preferred embodiments, the user's terminal automatically replies to the invitation message upon obtaining an IP address. The user's terminal may send the reply to the initiator's terminal. The reply preferably is sent via a packet switched service such as GPRS. When the initiator terminal's address is an IP or a WAP address, then the reply is preferably sent employing IP or WAP. For example, the reply may be an IP message sent via GPRS.

In a preferred embodiment, the reply includes a worldwide unique address (a second address) identifying the user to others. Additionally, the user's address may be requested from a stationary part of a communications system or network such as from a server at a backbone of the network. The user's terminal address may be requested before sending a reply.

In some embodiments, the user's terminal may already have an IP address. This may occur when the user's terminal is already online when the invitation message was received. For example, the user's terminal may have been using Internet or WAP services. If the user's terminal already has an IP address, the existing IP address may be used instead of requesting a new one. After sending the reply, the reply is received in a step 58. The initiator's terminal may receive the reply from the user's terminal. As mentioned above, the reply may be sent via GPRS.

After receiving the reply, the replying user or member is marked as active in a step 60. In a preferred embodiment, the initiator terminal may mark a member active upon receiving a reply to the invitation message from the member or the chat session is activated by the initiator terminal. When the chat session is activated by the initiator terminal, an additional server, such as a stationary server in a network backbone, is not needed to store or assign messages to the members once the chat session is active.

A determination is then made if the reply is a first reply in a second decisional step 61. If the reply is the first reply, the chat session becomes active in a step 62. At any time during an active chat session the initiator can invite other users to join the session. For this purpose, the initiator may transmit a new invitation message. The other users may join the chat session as described above.

During the chat session, an active member may leave the chat session by sending a "LEAVE" message to the initiator. The initiator's terminal may then automatically remove the leaving member from an active list and send each remaining active member an updated list. This leaving member is now set to be inactive and is not sent any more chat messages for the existing chat session. Preferably, the GPRS session of this member that left is now deactivated.

An inactive member may decide to join or rejoin a still active chat session by activating a GPRS session if one is not active. The inactive member may then send a "JOIN" message which includes his IP address to the initiator. The initiator may either accept or reject the join request. If rejected, the initiator sends a "JOIN REJECT" message to the inactive member who is requesting. The "JOIN REJECT" message may also include text.

If the initiator accepts the join request, the joining member is set to the active state and an updated active member list is sent to all active members including the joining member. When the joining member receives the active member list, the member knows that his request was accepted.

Once the chat session is active, data is sent in a step 68. Any of the active members can send data. In a preferred embodiment, the data may be chat text. The chat text may be text packed into a chat message and sent to all other active members using a packet switched service employing an IP. In other embodiments, the data may be other data including digital data such as images or digitized sounds.

When chat text is received by another member, the text is extracted, prefixed with the senders nickname which can be recognized such as by the source IP address and displayed. The display of each terminal may be divided into two portions and text to be transmitted may be entered using the top half of the display. The lower half may be used to display incoming text. When no text to be transmitted is being displayed, the whole screen may be used to display incoming text.

After sending data, the communication session ends in a step 70. The amount of chat text sent between active members may vary before the communication session ends. Additionally, the number of active members may vary before or when the communication session ends.

In one embodiment, the chat session may be terminated by the initiator sending a "TERMINATE" message to all active members. In some embodiments, the initiator may choose to pass the initiator status to another active member instead of terminating the session. If the initiator wants to pass on the initiator status, a message may be sent to a chosen active member. If the chosen active member accepts the initiator status, the chat session remains active with the chosen active member's terminal acting as server. The chosen active member may later terminate the chat session or pass the initiator status.

Returning now to the second decisional step 61, if the reply is not the first reply, then the active members list is updated in a step 64. In some embodiments, the initiator's terminal may automatically update the active members list when, for example, a second reply to the invitation message is received. This updated active members list includes the IP addresses, the nicknames and the telephone numbers of each active member.

After updating the list, the updated active members list is transmitted in a step 66. In some embodiments, the updated active members list may be automatically transmitted by the initiators terminal to each active member including the last active member who replied.

While the methods disclosed herein have been described and shown with reference to particular steps performed in a particular order, it will be understood that these steps may be combined, subdivided, or reordered to form an equivalent method without departing from the teachings of the present invention. Accordingly, unless specifically indicated herein, the order or grouping of the steps are not limitations of the present invention.

Furthermore, it will be appreciated that the above-described embodiment of the method and device according to the present invention has been set forth solely by way of example and illustration of the principals thereof and that further modifications and alterations may be made therein without thereby departing from the spirit and scope of the invention.

What is claimed is:

1. A method for providing short message service chat sessions with at least a first, second and third user of a communications system including at least a first, second and third terminal assigned thereto, respectively, said second and third terminals forming at least part of a group of terminals, comprising:

generating a list of selected users for each short message service chat session;

transmitting an initiation message for a short message service chat session from said first terminal to said group of terminals, said initiation message including a first address assigned to said first terminal;

dividing a display of said first terminal to simultaneously display text to be transmitted from said first terminal and text received from a terminal of said group of terminals, said dividing based on if there is text to be transmitted by said first terminal;

receiving said initiation message at said second terminal and said third terminal of said group of terminals;

transmitting a first reply to said initiation message from said second terminal of said group of terminals to said first terminal;

receiving said first reply at said first terminal;

transmitting a second reply to said initiation message from said third terminal to said first terminal;

receiving said second reply at said first terminal;

said first terminal marking said second and third terminals as active;

activating said short message service chat session;

creating a list of active terminals of said communication session;

transmitting said list of active terminals to at least one of said second and third terminals; and after said activating, employing said first terminal as a server for said communication short message service chat session to store messages of said short message service chat session or assign said messages to terminals assigned to participants of said short message service chat session, wherein said first terminal can transfer responsibility as said server to said second or third terminal.

2. The method as recited in claim 1 wherein said first reply includes a second address assigned to said second terminal.

3. The method as recited in claim 2 wherein at least one of said first address and said second address is a packet data protocol address.

4. The method as recited in claim 2 wherein at least one of said first address and second address is an Internet Protocol address.

5. The method as recited in claim 1 further comprising requesting said first address by said first terminal prior to transmitting said initiation message.

6. The method as recited in claim 2 further comprising requesting said second address by said second terminal prior to transmitting said first reply.

7. The method as recited in claim 1 wherein said transmitting said initiation message is performed in conjunction with a circuit switched service.

8. The method as recited in claim 1 wherein said transmitting said first reply is performed in conjunction with a packet switched service.

9. The method as recited in claim 1 wherein said transmitting said first reply is performed in conjunction with a General Packet Radio Service.

10. The method as recited in claim 1 wherein said transmitting said first reply is performed in conjunction with using an Internet Protocol.

11. The method as recited in claim 1 wherein at least one of said first terminal and said second terminal is selected from the group consisting of:
a mobile station,
a mobile phone,
a wirebound terminal,
a wirebound phone, and
a computer.

12. The method as recited in claim 1 wherein said communications system includes a network selected from the group consisting of:
a Global System for Mobile Communication, and
a Universal Mobile Telecommunications system.

13. The method as recited in claim 1 wherein at least one of said first and said second terminals enable at least one of said first and said second users to input data and said data is exchanged at least between said first and second terminals with a packet switched service after receiving said first reply at said first terminal.

14. The method as recited in claim 1 wherein said first address is requested at a stationary part of said communication system or, if said first terminal already has an existing address, using said existing address as said first address.

15. The method as recited in claim 14 further comprising selectively enabling at least one of said second and third users to input data and transmitting said data to each active terminal with a packet switched service.

16. A method for transmitting a circuit switched message from a first terminal assigned to a first user of a communications system to second and third terminals having second and third users, respectively, comprising:
   providing via said first terminal an input by said first user for said circuit switched message;
   defining a group of users including said second and third users;
   generating and transmitting a list of selected terminals for each short message service chat session including said second and third terminals;
   selecting a subscriber number for said second and third terminals;
   transmitting said message to said second and third terminals;
   employing said first terminal as a server for short message service chat session messages between said first, second and third terminals, wherein said first terminal can transfer responsibility as said server to said second or third terminal; and
   dividing a display of said first terminal to simultaneously display text to be transmitted from said first terminal and text received from another terminal, said dividing based on if there is text to be transmitted by said first terminal.

17. The method as recited in claim 16 wherein at least one of said subscriber numbers is a mobile subscriber number selected from a data base in said first terminal, said first terminal being a mobile station and said message being transmitted with short message service.

18. A mobile device for use with a communications system including said mobile device, a second terminal and a third terminal, comprising:
   means for storing an initiator address;
   means for transmitting an initiation message for a text chat session to receiving terminals wherein said initiation message includes said initiator address;
   means for receiving a reply message from at least one of said receiving terminals,
   means to activate said text chat session based on said reply message;
   means for dividing a display of said mobile device to simultaneously display text to be transmitted from said mobile device and text received from another device of said communications system, said dividing based on if there is text to be transmitted by said mobile device; and
   means to function as a server for said text chat session after said text chat session is activated, wherein said mobile device includes means to transfer responsibility as said server to said second or third terminal.

19. A device as recited in claim 18 further comprising means to transfer said function as said server to said at least one of said receiving terminals.

20. A device as recited in claim 18 further comprising means for storing a packet data protocol address and means for transmitting a packet data protocol address.

21. The device as recited in claim 18 further comprising means for storing an Internet Protocol address and means for transmitting an Internet Protocol address.

22. The device as recited in claim 18 further comprising means for requesting an address at said communications system.

23. The device as recited in claim 18 further comprising means for communicating an initiation message with a circuit switched service.

24. The device as recited in claim 18 further comprising means for communicating data employing a General Packet Radio Service.

25. The device as recited in claim 18 further comprising means for communicating data employing Internet Protocol.

26. The device as recited in claim 18 wherein said device is configured to communicate within a telecommunications network selected from the group consisting of:
   a Global System for Mobile Communication, and
   a Universal Mobile Telecommunications system.

27. The device as recited in claim 18 further comprising means for activating said communication session upon receiving said reply message.

28. The device as recited in claim 18 further comprising means for assigning said receiving terminals with an active status.

29. The device as recited in claim 18 further comprising:
   means for handling a list of active terminals;
   means for assigning each receiving terminal from which a reply message is received to said list of active terminals; and
   means for transmitting said list of active terminals to substantially each active terminal employing a packet data protocol addressed service.

30. A telecommunications network providing packet data protocol addressed service, comprising:
   a plurality of base transceiving stations,
   a plurality of base station controllers,
   at least a serving packet radio service support node; and a device including:
      means for storing an initiator address;
      means for transmitting an initiation message to a receiving device wherein said initiation message includes said initiator address;
      means for receiving a reply message from said receiving device;
      means for dividing a display of said device to simultaneously display text to be transmitted from said device and text received from said receiving device, said dividing based on if there is text to be transmitted; and
      means for functioning as a server for a text session after said text session is activated, wherein said mobile device can transfer responsibility as said server to said second or third terminal.

31. The telecommunications network as recited in claim 30 further comprising a gateway packet radio service support node for connecting said network to another packet data network.

* * * * *